July 22, 1924.
J. G. HAMPTON
WATER SUPPLY SYSTEM
Filed May 19, 1923
1,501,997
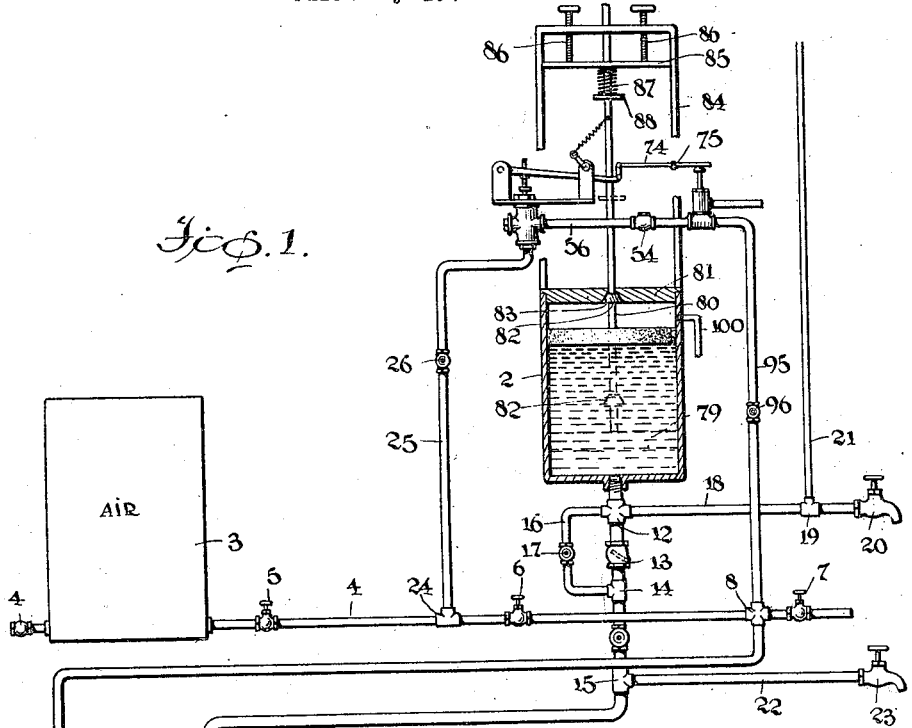
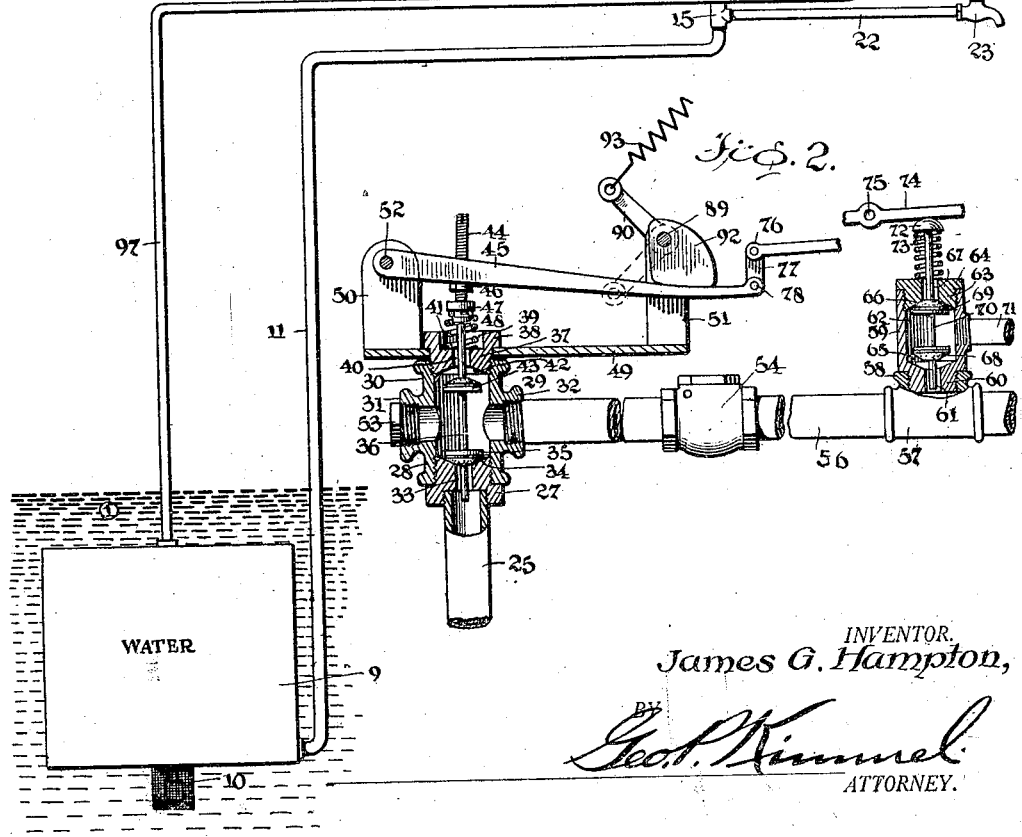
INVENTOR.
James G. Hampton,
BY Geo. F. Kimmel
ATTORNEY.

Patented July 22, 1924.

1,501,997

UNITED STATES PATENT OFFICE.

JAMES G. HAMPTON, OF LAFONTAINE, KANSAS.

WATER-SUPPLY SYSTEM.

Application filed May 19, 1923. Serial No. 640,177.

*To all whom it may concern:*

Be it known that I, JAMES G. HAMPTON, a citizen of the United States, residing at Lafontaine, in the county of Wilson and State of Kansas, have invented certain new and useful Improvements in Water-Supply Systems, of which the following is a specification.

This invention relates to water supply system, more particularly to an automatically operable regulating or controlling device for supply forming an element of the system, and the invention has for its object to provide, in a manner as hereinafter set forth, a water supply system including means to provide for the raising of water from a lower to a higher level from which the water is capable of being discharged for use, and furthermore, including means for automatically controlling or regulating the supply of water from a lower to a higher level.

Further objects of the invention are to provide a water supply system which is simple in its construction and arrangement, compact, thoroughly efficient in its use, readily installed and comparatively inexpensive.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a sectional elevation of a water supply system in accordance with this invention.

Figure 2 is a fragmentary view, in section, illustrating the automatic regulating device.

Referring to the drawings in detail, 1 denotes a source of water supply, which may be a tank or a well and which is termed the lower water level. Arranged above the source 1, at any suitable height, is a tank 2 adapted to be supplied with water from the source 1, and said tank 2 is termed the upper water level. Arranged above the source 1, at any suitable point, is a compressed air storage receptacle 3, provided with a pipe 4 leading to a suitable source of supply. Preferably the receptacle 3 is arranged below the tank 2. Extending from the lower portion of the receptacle 3 is a discharge pipe 4, provided with cut-off valves 5, 6 and 7 and further having interposed therein in proximity to the valves 7, a four-way coupling 8.

Located in the source 1, is a water collecting vessel 9, having its bottom formed with an inlet controlled by a check valve 10, which is surrounded by any suitable means to constitute a strainer, so as to prevent entrance of foreign substances into the vessel 9. Water from the source 1 enters into the vessel 9 through the entrance which is controlled by the check valve 10.

Leading from the lower portion of the vessel 9, to the bottom of the tank 2 is a water conducting pipe 11, which is employed for supplying water from the vessel 9 to the tank 2. Interposed in the pipe 11 is a four-way coupling 12, a check valve 13, and three-way couplings 14 and 15. Extending from the coupling 12 to the coupling 14 is a by-pass 16, provided with a cut-off valve 17. Extending from the four-way coupling 12 is a discharge pipe 18, having interposed therein a three-way coupling 19, and said pipe 18 has its outer end provided with a faucet 20. Secured to and extending upwardly from the coupling 19, as well as communicating with the pipe 18, is a stand pipe 21. Secured to and projecting from the coupling 15 is a draw-off pipe 22, having its outer end provided with a faucet 23.

The pipe 4 is furthermore provided with a three-way coupling 24, from which extends an air conducting pipe 25 provided with a cut-off valve 26. The upper end of the pipe 25 is secured to a plug 27 which extends into and is secured with the vertical leg 28 of a four-way coupling referred to generally by the reference character 29. The other vertical leg of the coupling 29 is indicated at 30, and the horizontal legs of the coupling 29 are indicated at 31, 32. The plug 27 is formed with a port or passage 33 of less diameter than the inner diameter of the pipe 25, and the inner end of said plug 27 is set up to provide a valve seat 34, for a conoidal-shaped valve 35, which is carried by a vertical disposed valve stem 36 at a point removed from the lower end of said stem. The portion of the stem 36 which is arranged below the valve 35 operates through the port or passage 33.

Secured in the upper vertical leg 30 of the four-way coupling 29, is the stem 37 of a closure plug, and said plug further includes a head 38 of greater diameter than the diameter of the stem 37. The head 38 is formed with an opening 39 and the stem 37 with a port or passage 40 of less diameter than the diameter of the opening 39, thereby providing a shoulder 41. The inner end of the stem 37 is constructed to provide a valve seat 42 for a conoidal-shaped valve 43, which is carried by the stem 36 inwardly with respect to the upper terminal portion of said stem 36. The seats 34 and 42 are oppositely disposed with respect to each other and the arrangement of the valves 35 and 43 is such that said valves are oppositely disposed with respect to each other. The manner in which the valves seat is such that when the valve 35 is against the seat 34, the valve 43 is removed from its seat 42, and when the valve 43 is in engagement with the seat 42 the valve 35 is raised from off its seat 34. The manner in which the stem 36 is operated to seat and unseat the valves will be presently referred to.

The valve stem 36 extends upwardly through the port or passage 40 and above the head 38, and is formed with a screw threaded upper terminal 44, which extends through a lever arm 45. Carried by the threaded terminal 44 of the stem 36, is an adjustable nut 46, engageable by the lever 45 for the purpose of lowering the stem 36. Adjustably mounted on the threaded terminal 44 is a collar 47, between which and the seat 41 is interposed an expansible and contractile coiled spring 48, which surrounds the stem 36, and the function of the spring 48 is to maintain the valve stem in an elevated position and with the valve 43 positioned against the seat 42, thereby closing the four-way coupling 29 to the atmosphere. When the lever 45 is shifted to lower the stem 36, such movement is had against the action of the spring 48, so that when pressure is removed on the lever 45 the spring 48 will expand and elevate the stem 36. When the stem 36 is lowered, the valve 35 is positioned against the seat 45, thereby closing the four-way coupling 29 to the pipe 25.

Mounted on the vertical leg 30, of the four-way coupling 29, and secured in position by the head 38 of that plug which is secured in the leg 30, is a support 49 provided at one end with a vertical lug 50 and at its other end with a vertical arm 51. Pivotally connected to the lug 50, as at 52, is one end of the lever 45. The lever 45 extends beyond the arm 51 for a purpose to be hereinafter referred to.

The outer horizontal leg 31, of the four-way coupling 29, is closed by a removable plug 53, and the inner horizontal leg 32 of the coupling 29 has connected therewith an air conducting pipe 56, which has secured therewith a three-way coupling 57. The pipe 56 is provided with a check valve 54. The vertical leg of the coupling 57 is indicated at 58, and which has mounted thereon a valve casing 59, the latter is formed with a reduced extension 60 at its lower end, which has threaded engagement with the leg 58, whereby the casing 59 is secured to the coupling 57. The reduced extension 60 of the casing 59 is formed with a port or passage 61 which opens into the valve chamber 62, formed by the casing 59. The upper end of the casing 59 is closed by a removable plug consisting of a stem 63 and a head 64. The inner face of the bottom of the casing 59, is formed to constitute a valve seat 65, and the inner face of the stem 63 is formed to provide a valve seat 66. The port or passage 61 establishes communication between the pipe 56 and the chamber 62, and communication is established between chamber 62 and the atmosphere through the medium of a port or passage 67 formed in the stem 63 and head 64 of the plug, which closes the upper end of the casing 59. The valve seats 65 and 66 are oppositely disposed with respect to each other, and cooperating with the valve seat 65, for the purpose of closing the port or passage 61, is a valve 68, and cooperating with the seat 66 for the purpose of closing the port or passage 67, is a valve 69. The valves 68 and 69 are carried by a valve stem 70, and are arranged in spaced relation and when the valve 68 is off of its seat 65, the valve 69 engages its seat 66, and when the valve 69 is off of its seat 66 the valve 68 is in engagement with its seat 65. Communication is also established between the chamber 63 and the atmosphere by an exhaust pipe 71.

The valve stem 69 projects through the port 67 and carries on its outer end an adjustable abutment 72, and interposed between the latter and the head 64, as well as surrounding the valve stem 70, is an expansible and contractile coiled spring 73, the function of which is to normally retain the valve 69 against the seat 66. Engaging with the abutment 72, for the purpose of shifting the valve stem 70 downwardly to provide for the engaging of the valve 68 with its seat 65 to close the port 61, is a lever arm 74, which is pivoted intermediate its ends, as at 75, and has its inner end pivotally connected as at 76 to a link 77, the latter being pivotally connected as at 78, to the inner end of the lever arm 45. The normal position of the lever 74 is to provide for the lowering of the stem 70, so that the valve 68 will engage the seat 65, but when pressure is removed from the arm 74, the spring 73 will shift the stem 70 upwardly thereby causing the valve 69 to engage the seat 66. The manner in which the lever arm 45 is shifted downwardly for the purpose of lowering the stem 36 and to provide for the shifting of the lever 74 to allow the elevating of the stem 70, will be presently referred to.

Operating in the tank 2 is a piston 79 provided with a stem 80, which projects up through the top 81 of the tank 2. The piston 80 is provided with a bevelled collar 82, which cooperates with a bevelled pocket 83 formed in the top 81 of the tank 2, for the purpose of providing a seal when the piston 79 is elevated a predetermined distance. Secured to the tank 2 and extending upwardly therefrom is a frame 84, formed with a cross bar 85, and the piston rod 80 is of a length to extend through the bar 85 and the top of the frame 84. The bar 85 is adjustable and is connected with the top of the frame 84, by a pair of adjusting elements 86, and said bar 85 is provided for increasing or decreasing the tension of a coiled spring 87, which is interposed between the bar 85 and a collar 88 mounted on the piston rod 80. The spring 87 surrounds the rod 80 between the collar 88 and the bar 85.

Carried by the arm 51 is a short shaft 89, provided with a crank arm 90, and furthermore provided with a cam 92 engageable with the lever arm 45 for the purpose of shifting it to lower the stem 36. The crank arm 90 is connected with the piston rod 80 by a resilient element 93. The crank arm 90 is shifted by the element 93 for the purpose of moving the cam 92 in engagement with the lever arm 45 to lower the latter, thereby lowering the stem 36.

Extending from the coupling 57, to the coupling 8, is a compressed air conducting pipe 95, provided with a cut-off 96, and leading from the coupling 8 to the top of the vessel 9 is a compressed air conducting pipe 97.

It will be assumed that the valves 5, 26 and 96 are open and the valves 6 and 7 closed and further with the valve 35 off its seat and the valve 68 against its seat and with the piston 79 in the position as shown. The compressed air from the receptacle 3 will be conducted through the pipes 4, 25, 56, 95 and 97 to the vessel 9, entering at the top thereof, and which will force the water from the vessel 9 up through the pipe 11 into the tank 2 and elevate the piston 79 until its movement is arrested by the collar 82. As the piston rod 80 moves upwardly it will carry the element 93 therewith, causing the arm 90 to rotate the shaft 89 whereby the cam 92 will engage the lever arm 45, lowering the stem 46, causing the valve 35 to engage the seat 34 and arrest the supply of compressed air to the tank 3 from the vessel 9. When the lever arm 45 is depressed to lower the stem 36, the lever 74 will have that end engaging with the abutment 72 elevated, whereby the spring 73 will act on the stem 70, to shift the same upwardly thereby moving the valve 68 away from its seat 65, and the exhaust of compressed air will be had from the pipes 56, 95 and 97 to the atmosphere. The resilient element 93 provides for a quick action of the shaft 89 and cam 92 immediately upon passing of dead center.

The valve mechanisms connected to the pipes 25 and 56, as well as the operating means for said valves, provide a controlling or regulating means for the supply of water from the lower level as indicated at 1, to the higher level as indicated at 2, and if it be desired to employ a system without the controlling or regulating device the valves 26 and 96 are closed and the valve 6 opened, as well as the valve 5, and by this arrangement the compressed air can be supplied to the vessel 9 for the purpose of raising the water to the tank 2. The valve 7 is provided for the purpose of exhausting the compressed air from the receptacle 3. The by-pass 16 provides means for emptying the tank 2, as well as the pipe 18.

The stand pipe 21 permits of the water delivered to the tank 2 to rise to any desired height under the pressure established in the tank 2 through the pipe 12.

The tank 2, above the piston 79 is provided with an escape pipe 100, permitting of the escape of any accumulation of pressure above the piston 79.

The valve 54 is provided to prevent exhaust from passing out around the first valve stem but pass out through exhaust pipe 71, entering the three-way coupling. If there is only one valve used, the exhaust must pass out port around valve stem. The object in adding the check valve and second valve is for the purpose of exhausting the air through a pipe whereby it can be conserved for further use.

Valve 7 exhausts air from the receptacle 9.

The first valve spring 39 should be sufficiently strong to overcome spring 73, or another spring installed, pressing lever 74 down on valve stem 67, overcoming spring 73.

From the foregoing construction taken in connection with the accompanying drawings, a water supply system is set up providing for the raising of water from a lower to a higher level and further providing means whereby the water supplied from the lower to the higher level is controlled so that when a predetermined quantity of water has been raised to a higher level the supply of such level will be automatically discontinued until the predetermined quantity raised to the higher level has been reduced by use or discharge from the higher level, and although the preferred embodiment of the invention is as illustrated and described, yet it is to be understood that changes in the arrangement of parts can be had which will fall within the light of the invention as claimed.

What I claim is:—

A water supply system comprising a compressed air receptacle, a water collecting vessel, a compressed air conduit leading from the receptacle to said vessel, a water receiving tank, a vertically movable spring controlled fluid operated element within and extending from said tank, a water conduit leading from the vessel to the tank, a pair of spaced valve mechanisms interposed in the air conduit for closing the latter to said vessel and opening it to the atmosphere, a support mounted on one of mechanisms, a pair of lever arms linked together and each seating on one of said mechanisms, one of said arms pivoted to said support, and a spring controlled cam pivotally mounted on said support and connected to said element for simultaneously actuating said arms when said element is shifted by fluid pressure whereby said valve mechanisms are synchronously operated to close the air conduit to said vessel and to open it to the atmosphere.

In testimony whereof, I affix my signature hereto.

JAMES G. HAMPTON.